(12) United States Patent
Kalina

(10) Patent No.: US 6,735,948 B1
(45) Date of Patent: May 18, 2004

(54) DUAL PRESSURE GEOTHERMAL SYSTEM

(75) Inventor: Alexander I. Kalina, Hillsborough, CA (US)

(73) Assignee: Icalox, Inc., Belmont, CA (US)

( * ) Notice: Subject to any disclaimer, the term of this patent is extended or adjusted under 35 U.S.C. 154(b) by 0 days.

(21) Appl. No.: 10/320,345

(22) Filed: Dec. 16, 2002

(51) Int. Cl.⁷ .......................... F01K 25/06; F01K 7/34; F03G 7/00
(52) U.S. Cl. .............................. 60/649; 60/651; 60/653; 60/671
(58) Field of Search ........................... 60/649, 651, 653, 60/671

(56) References Cited

U.S. PATENT DOCUMENTS

| | | | | |
|---|---|---|---|---|
| 4,346,561 A | 8/1982 | Kalina | ...................... | 60/641.6 |
| 4,489,563 A | 12/1984 | Kalina | ...................... | 60/673 |
| 4,548,043 A | 10/1985 | Kalina | ...................... | 60/649 |
| 4,586,340 A | 5/1986 | Kalina | ...................... | 60/649 |
| 4,604,867 A | 8/1986 | Kalina | ...................... | 60/653 |
| 4,674,285 A | 6/1987 | Durrant et al. | ...................... | 10/646 |
| 4,732,005 A | 3/1988 | Kalina | ...................... | 60/649 |
| 4,763,480 A | 8/1988 | Kalina | ...................... | 60/678 |
| 4,899,545 A | 2/1990 | Kalina | ...................... | 60/673 |
| 4,982,568 A * | 1/1991 | Kalina | ...................... | 60/649 |
| 5,029,444 A | 7/1991 | Kalina | ...................... | 60/673 |
| 5,095,708 A | 3/1992 | Kalina | ...................... | 60/673 |
| 5,440,882 A * | 8/1995 | Kalina | ...................... | 60/651 |
| 5,450,821 A | 9/1995 | Kalina | ...................... | 122/1 R |
| 5,572,871 A | 11/1996 | Kalina | ...................... | 60/649 |
| 5,588,298 A | 12/1996 | Kalina et al. | ...................... | 60/676 |
| 5,603,218 A | 2/1997 | Hooper | ...................... | 60/655 |
| 5,649,426 A * | 7/1997 | Kalina et al. | ...................... | 60/649 |
| 5,754,613 A | 5/1998 | Hashiguchi et al. | ...................... | 376/378 |
| 5,822,990 A | 10/1998 | Kalina et al. | ...................... | 60/649 |
| 5,950,433 A * | 9/1999 | Kalina | ...................... | 60/649 |
| 5,953,918 A * | 9/1999 | Kalina et al. | ...................... | 60/653 |
| 6,347,520 B1 | 2/2002 | Ranasinghe et al. | ...................... | 60/649 |

* cited by examiner

Primary Examiner—Sheldon J. Richter
(74) Attorney, Agent, or Firm—Robert W. Strozier

(57) ABSTRACT a new thermodynamic cycle is disclosed for converting energy from a low temperature stream from an external source into useable energy using a working fluid comprising of a mixture of a low boiling component and a higher boiling component and including a higher pressure circuit and a lower pressure circuit. The cycle is designed to improve the efficiency of the energy extraction process by mixing the liquid stream from the high pressure circuit with the spent low pressure circuit stream forming a lean system that can be condensed at a low pressure. The new thermodynamic process and the system for accomplishing it are especially well-suited for streams from low-temperature geothermal sources.

9 Claims, 2 Drawing Sheets

DUAL PRESSURE GEOTHERMAL SYSTEM

BACKGROUND OF THE INVENTION

1. Field of the Invention

The present invention relates to process and system for converting thermal energy from moderately low temperature sources, especially from geothermal fluids, into mechanical and/or electrical energy.

More particularly, the present invention relates to a process and system for converting thermal energy from moderately low temperature sources, especially from geothermal fluids, into mechanical and/or electrical energy including high pressure and low pressure circuits, where all partially condensed liquid from the high pressure circuit is combined with the stream coming from the low pressure circuit forming a lean stream which can be condensed at a pressure lower than a pressure required to condense the stream had its composition not been made lean or its concentration lowered.

2. Description of the Related Art

Prior art methods and systems for converting heat into useful energy at well documented in the art. In fact, many such methods and systems have been invented and patented by the inventor. These prior art systems include U.S. Pat. Nos. 4,346,561, 4,489,563, 4,548,043, 4,586,340, 4,604,867, 4,674,285, 4,732,005, 4,763,480, 4,899,545, 4,982,568, 5,029,444, 5,095,708, 5,440,882, 5,450,821, 5,572,871, 5,588,298, 5,603,218, 5,649,426, 5,822,990, 5,950,433 and 5,593,918; Foreign References:7-9481 JP and Journal References: NEDO Brochure, "ECO-Energy City Project", 1994 and NEDO Report published 1996, pp. 4–6, 4–7, 4–43, 4–63, 4–53, incorporated herein by reference.

Although all of these prior art systems and methods relate to the conversion of thermal energy into other more useful forms of energy from moderately low temperature sources, all suffer from certain inefficiencies. Thus, there is a need in the art for an improved system and method for converting thermal energy from moderately low temperature sources to more useful forms of energy, especially for converting geothermal energy from moderately low temperature geothermal streams into more useful forms of energy.

SUMMARY OF THE INVENTION

The present invention also provides a method and a systems for implementing a thermodynamic cycle including a higher pressure and a lower pressure circuit, where one novel feature of the system or method involves combining a separated spent liquid stream from the higher pressure circuit with a spent stream from the lower pressure circuit prior to the condensing steps. Because the separated spent liquid stream has a leaner composition than the initial fully condensed working fluid, the stream can be condensed at a lower pressure and then combined with the separated vapor from the higher pressure circuit to form the fully condensed initial working fluid liquid stream.

The present invention provides a method for implementing a thermodynamic cycle to convert a greater amount of thermal energy from an external heat source into useful electric and/or mechanical energy, where the method includes the steps of transforming thermal energy from a fully vaporized higher pressure stream into a usable energy form to product a spent higher pressure stream and transforming thermal energy from a vaporized lower pressure stream into a usable energy form to product a spent lower pressure stream. The method further includes the steps of heating a higher pressure liquid stream with a portion of a spent higher pressure stream to form a heated higher pressure stream and a first partially condensed spent higher pressure stream and heating a lower pressure stream with a remaining portion of the spent higher pressure stream to form a heated lower pressure stream and a second partially condensed spent higher pressure stream. The method also includes the steps of heating the heated higher pressure liquid stream with a portion of an external heat source stream to form a hotter higher pressure stream and a first spent external heat source stream and heating the heated lower pressure stream with a remaining portion of the external hear source stream to form a vaporized lower pressure stream and a second spent external heat source stream. The method also includes the steps of heating the hotter higher pressure stream with the external heat source stream to form the fully vaporized higher pressure stream, separating the partially condensed spent higher pressure streams into a spent higher pressure liquid stream and a spent higher pressure vapor stream, mixing the spent higher pressure liquid stream with the spent lower pressure stream at the pressure of the spent lower pressure stream to form a combined spent lower pressure stream and condensing the combined spent lower pressure stream with an external cooling stream to form a condensed spent lower pressure stream. The method further includes the steps of mixing the condensed spent lower pressure stream with the spent higher pressure vapor stream to form a combined partially condensed spent higher pressure stream at the pressure of the spent higher pressure vapor stream, condensing the combined partially condensed spent high pressure stream to form a fully condensed liquid stream; and forming the higher pressure stream and the lower pressure stream from a fully condensed liquid stream.

The present invention also provides a method for improved energy conversion of heat from external heat sources including the steps of forming a higher pressure working fluid stream and a lower pressure working fluid stream from a fully condensed working fluid stream. After the two streams are formed, the higher pressure working fluid stream is heated with a portion of a spent higher pressure working fluid stream to form a heated higher pressure working fluid stream and a first partially condensed spent higher pressure working fluid stream, the heated higher pressure working fluid stream is heated with a portion of a partially cooled external source stream to form a hotter higher pressure working fluid stream and a first spent external source stream and finally the hotter higher pressure working fluid stream is vaporized with an external source stream to form a fully vaporized higher pressure working fluid stream and the partially cooled external source stream. Once fully vaporized, the thermal energy from the fully vaporized higher pressure working fluid stream is transformed into a usable energy form to product a spent higher pressure working fluid stream. While the higher pressure stream is being processed, the lower pressure, working fluid stream is heated with a remaining portion of the spent higher pressure working fluid stream to form a heated lower pressure working fluid stream and a second partially condensed spent higher pressure working fluid stream, and the heated lower pressure working fluid stream is heated with a remaining portion of the partially cooled external source stream to form a vaporized lower pressure working fluid stream and a second spent external source stream. Once vaporized, the thermal energy from the vaporized lower pressure working fluid stream is transformed into a usable energy form to product a spent lower pressure working fluid stream. The first and second partially condensed, spent higher pressure working fluid streams are separated into a spent higher pressure liquid working fluid stream and a higher pressure vapor working fluid stream and the spent lower pressure working fluid stream is mixed with the spent higher pressure liquid working fluid stream at the lower pressure to form a combined spent lower pressure working fluid stream. The combined spent lower pressure working fluid stream is cooled with an external cooling stream to form a condensed lower pressure working fluid stream, while the condensed lower pressure working fluid stream and the spent higher pressure vapor working fluid stream at a pressure of the spent higher pressure vapor working fluid stream is cooled with another external cooling stream to form the fully condensed working fluid stream.

The present invention also provides an apparatus for improved conversion of thermal energy into mechanical and/or electrical energy including a first means for expanding a fully vaporized higher pressure stream, transferring its energy into usable form and producing a higher pressure spent stream and a second means for expanding a fully vaporized lower pressure stream, transferring its energy into usable form and producing a lower pressure spent stream. The apparatus also includes a first heat exchanger adapted to condense a combined lower pressure spent stream with an external coolant stream to form a condensed combined lower pressure spent stream, a first pump adapted to increase a pressure of the condensed combined lower pressure spent stream to form an increased pressure, condensed combined lower pressure spent stream, and a first stream mixer adapted to combine the increased pressure, condensed combined lower pressure spent stream and a vapor higher pressures spent stream to form a partially condensed stream. The apparatus also includes a second heat exchanger adapted to condense the partially condensed stream with an external coolant stream to form a fully condensed liquid stream and a first stream splitter adapted to form first and second portions of the fully condensed liquid stream. The apparatus also includes a second pump adapted to increase a pressure the first portion of the fully condensed liquid stream to form a higher pressure liquid stream and a third pump adapted to increase a pressure the second portion of the fully condensed liquid stream to form a lower pressure liquid stream. The apparatus also includes a third heat exchanger adapted to heat the higher pressure liquid stream with a first portion of a higher pressure spent stream to form a heated higher pressure liquid stream and a first partially condensed higher pressure spent stream and a fourth heat exchanger adapted to heat the lower pressure liquid stream with a remaining portion of the higher pressure spent stream to form a heated lower pressure liquid stream and a second partially condensed higher pressure spent stream. The apparatus also includes a fifth heat exchanger adapted to heat the heated higher pressure liquid stream with a first portion of a partially cooled external heat source stream to form a hotter higher pressure liquid stream and a first spent external heat source stream and a sixth heat exchanger adapted to heat the heated lower pressure liquid stream with a remaining portion of the partially cooled external heat source stream to form a vaporized lower pressure stream and a second spent external heat source stream. The apparatus also includes a seventh heat exchanger adapted to vaporize the hotter higher pressure liquid stream with an external heat source stream mixer to form the fully vaporized higher pressure stream and the partially cooled external heat source stream. The apparatus also includes a second stream splitter adapted to form the first and second portions of the higher pressure spent stream, a third stream splitter adapted to form the first and second portions of the cooled external heat source stream, a second stream mixer adapted to combine the first and second partially condensed higher pressure spent stream to form a combined partially condensed higher pressure spent stream, a gravity separator adapted to separate combined partially condensed higher pressure spent stream into a lean liquid stream and a rich vapor stream, a throttle valve adapted to change the pressure of the lean liquid stream to a pressure of the lower pressure spent stream and a third stream mixer adapted to combine the pressure adjusted lean liquid stream with the lower pressure spent stream. The apparatus is capable of achieving improved efficiency due to the mixing of the lean liquid stream with the spent lower pressure stream so that the combined stream can be condensed at a lower pressure than a non-lean stream.

DESCRIPTION OF THE DRAWINGS

The invention can be better understood with reference to the following detailed description together with the appended illustrative drawings in which like elements are numbered the same.

DETAILED DESCRIPTION OF THE INVENTION

The inventors have found a novel thermodynamical cycle (system and process) can be implements using a working fluid including a mixture of at least two components. The preferred working fluid being a water-ammonia mixture, though other mixtures, such as mixtures of hydrocarbons and/or freons can be used with practically the same results. The systems and methods of this invention are more efficient for converting heat from relatively low temperature fluid such as geothermal source fluids into a more useful form of energy. The systems use a multi-component basic working fluid to extract energy from one or more (at least one) geothermal source streams in one or more (at least one) heat exchangers or heat exchanges zones. The heat exchanged basic working fluid then transfers its gained thermal energy to one or more (at least one) turbines (or other system for extracting thermal energy from a vapor stream and converting the thermal energy into mechanical and/or electrical energy) and the turbines convert the gained thermal energy into mechanical energy and/or electrical energy. The systems also include pumps to increase the pressure of the basic working fluid at certain points in the systems and one or more (at least one) heat exchangers which bring the basic working fluid in heat exchange relationships with one or more (at least one) cool streams. One novel feature of the systems and methods of this invention, and one of the features that increases the efficiency of the systems, is the result of using a two circuit design having a higher pressure circuit and a lower pressure circuit and where a stream comprising spent liquid separated for spent vapor from the higher pressure circuit is combined with a stream comprising the spent lower pressure stream at the pressure of the spent lower pressure stream prior to condensation to from the initial fully condensed liquid stream and where the combined stream is leaner than the initial fully condensed liquid stream.

The working fluid used in the systems of this inventions preferably is a multi-component fluid that comprises a lower boiling point component fluid—the low-boiling component—and a higher boiling point component—the high-boiling component. Preferred working fluids include an ammonia-water mixture, a mixture of two or more hydrocarbons, a mixture of two or more freon, a mixture of hydrocarbons and freon, or the like. In general, the fluid can comprise mixtures of any number of compounds with favorable thermodynamic characteristics and solubility. In a particularly preferred embodiment, the fluid comprises a mixture of water and ammonia.

Figure 1A:
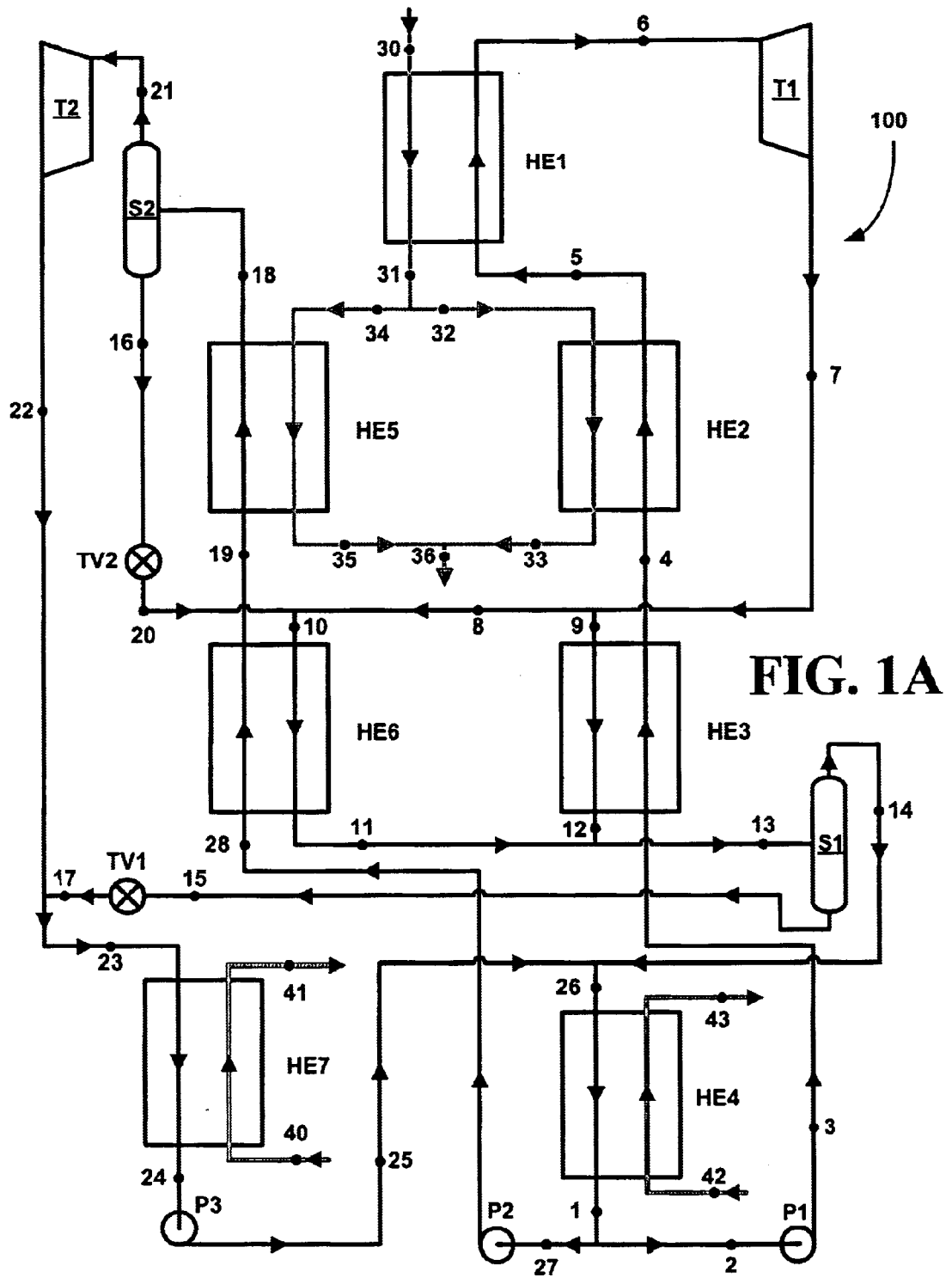
FIG. 1A depicts a preferred embodiment of an apparatus for implementing the novel thermodynamic method and system of this invention.

Referring now to FIG. 1A, a flow diagram, generally 100, is shown that illustrates a preferred embodiment a system and method of energy conversion of this invention and will be described in terms of its components and its operation.

A condensed working fluid having parameters as at a point 1 is divided into two sub streams having parameters as at points 2 and 27, respectively. The stream having the parameters of the point 2 enters pump P1, where the stream is pumped to a desired high pressure and obtains parameters as at a point 3. Thereafter, the stream having the parameters of the point 3 passes through a first heat exchanger HE3, where it is heated in counter flow with a returning, condensing stream in a condensing step defined by points 9–12 (described below), and obtains parameters as at a point 4. The state of the working fluid at the point 4 corresponds to a sub cooled liquid. Thereafter, the stream having the parameters of the point 4 passes through a second heat exchanger HE2 where it is further heated by an external heat source stream (e.g., a geothermal brine stream) and obtains parameters as at a point 5, where the parameters at the point 5 correspond to a saturated liquid.

Next, the stream having the parameters of the point 5 passes through a third heat exchanger HE1 in counter flow with the external heat source stream (the geothermal brine stream), where the stream of working liquid is fully evaporated and slightly superheated to obtain parameters as at a point 6. The vapor stream having the parameters of the point 6 passes through a first high pressure turbine T1 where the vapor stream expands, producing mechanical work, and obtains parameters as at a point 7. The stream having the parameters of the point 7 is then divided into two sub streams having parameters as at points 8 and 9, respectively. The stream having the parameters of the point 9 passes through the first heat exchanger HE3 where it is cooled and condensed providing heat for the 3–4 heating step (described above) and obtains parameters as at a point 12.

The stream having the parameters of the point 8 is then mixed with a stream having parameters as at a point 20 (described below) and obtains parameters as at a point 10. Thereafter, the stream having the parameters of the point 10 passes through a fourth heat exchanger HE6, where it is cooled and condensed, releasing heat for a heating step 28–19 (described below), and obtains parameters as at a point 11. Thereafter, streams having the parameters of the points 11 and 12, respectively, are combined forming a stream having parameters as at a point 13. The stream having the parameters of the point 13 enters a gravity separator S1, where it is separated into a rich vapor having parameters as at a point 14 and into a lean liquid having parameters as at a point 15. The term a rich vapor stream means that the vapor has a higher concentration of the light boiling component than the original basic working fluid as at the point 1, while the lean liquid stream means that the liquid has a lower concentration of the light boiling component than the original basic working fluid as at the point 1.

The sub-stream of fully condensed working fluid having the parameters of the point 27 (as described above) enters into a second pump P2, where it is pumped to a desired elevated pressure and obtains parameters as at a point 28. The pressure at point 28 is substantially lower than the pressure at the point 3. The stream having the parameters of the point 28 then passes through the fourth heat exchanger HE6 where it is heated by heat released in the process step 10–11 (described above) and obtains parameters as at a point 19. Thereafter, the stream having the parameters as at the point 19 passes through a fifth heat exchanger HE5, where it is further heated and evaporated by the external heat source sub-stream (e.g., the geothermal brine stream) and obtains parameters as at point a 18. Usually working fluid having the parameters as at the point 18 is not fully vaporized. A pressure of the working fluid in the process step 19–18 is substantially lower than the pressure of the working fluid in the process step 5–6 (described above). Therefore, the stream in the process step 19–18 starts to boil at a substantially lower temperature than the stream in the process step 5–6. This allows the use of geothermal brine stream to heat the working fluid in the process step 5–6 and thereafter to use a portion of the same brine stream having a lower temperature, to provide heat for the process step 19–18.

The geothermal brine stream, which is the heat source for a preferred use of the system of this invention, has initial parameters as at a point 30. The brine stream having the parameters of the point 30 initially passes though the third heat exchanger HE1, providing heat for the process step 5–6 and obtains parameters as at a point 31. Thereafter, the brine stream having the parameters of the point 31 is divided into two brine sub streams having parameters as at points 32 and 34, respectively. The stream having the parameters of the point 32 passes through the second heat exchanger HE2 providing heat for the process step 4–5, and obtains parameters as at a point 33. Meanwhile, the stream having the parameters of the point 34 passes through the fifth heat exchanger HE5, providing heat for the process step 19–18, and obtains parameters as at a point 35 (described above). Thereafter, the cooled brine sub streams having the parameters of the points 33 and 35 are combined, forming a spent brine stream having parameters as at a point 36, at which point the brine stream is removed from the system.

The stream of working fluid having the parameters of the point 18 (described above) enters a second gravity separator S2, where it is separated into a rich vapor stream having parameters as at a point 21 (i.e., rich means a higher concentration of the low boiling component—ammonia in water-ammonia fluids) and a relatively lean liquid stream having parameters as at a point 16 (i.e., rich means a lower concentration of the low boiling component—ammonia in water-ammonia fluids). The liquid stream having the parameters of the point 16 passes through a second throttle valve TV2, where its pressure is reduced to a pressure equal to the pressure of the stream having the parameters of the point 8, and obtains parameters as at a point 20. The stream having the parameters of the point 20 is combined with the stream having the parameters of the point 8 forming a combined stream having parameters of the point 10 (described above). The stream having the parameters of the point 20 is substantially leaner (i.e., lower concentration of low boiling component) than the stream having the parameters of the point 8, and therefore, the combined stream having the parameters of the points 10 and 11 is leaner than the stream having the parameters of the point 8. The stream having the parameters of the point 11, is then combined with the stream having the parameters of the point 12, forming a stream having parameters as at a point 13, which is likewise leaner than the streams having the parameters of the points 8 and 9.

The vapor stream having the parameters of the point 21 passes though a low pressure turbine T2, where the vapor stream having the parameters of the point 21 expands producing mechanical work and obtains parameters as at a point 22. Meanwhile, the liquid stream having the parameters of the point 15 (described above) passes through a second throttle value TV1, where its pressure is reduced to a pressure equal to the pressure of the stream having the parameters of the point 22, and obtains parameters as at a point 17. Thereafter, the stream having the parameters of the point 17 is combined with the stream having the parameters of the point 22 forming a stream with parameters as at a point 23. The stream having the parameters of the point 23 is formed by combining the lean liquid stream having the parameters of the point 15 coming from the separator S1 with the turbine exhaust stream having the parameters of the point 22 coming from the turbine T2. As a result, the concentration of the low boiling component in the stream having the parameters of the point 23 is substantially lower than the concentration of the low boiling component in the working fluid stream having the parameters of the point 1. This allows the stream having the parameters of the point 23 to be condensed at a lower pressure than the pressure of the stream having the parameters of the point 1, increasing the power output from the turbine T2.

The stream having the parameters of the point 23 passes through an air (or water cooled) condenser or sixth heat exchanger HE7, where the stream having the parameters of the point 23 is fully condensed and obtains parameters as at a point 24. The stream having the parameters of the point 24, where the parameters correspond to a saturated liquid, enters pump P3 where its pressure is increased to a pressure equal to the pressure of the stream having parameter of the point 14, and obtains parameters as at a point 25. Thereafter the streams having the parameters of the points 14 and 25 are combined forming a stream having parameters as at a point 26. The composition of working fluid at the point 26 is the same as the composition of the working fluid at the point 1. The stream having the parameters of the point 26 then passes though an air or water cooled condenser or a seventh heat exchanger HE4 where it is fully condensed, obtaining the stream having the parameters of the point 1. This preferred embodiment is, therefore, a closed cycle.

The parameters of all points of the proposed system are presented in Table 1.

TABLE 1

Parameter of Points in the Embodiment of FIG. 1A

| Point No. | Concentration X | Temperature T (°F.) | Pressure P (psia) | Enthalpy h (btu/lb) | Weight (g/g6) |
|---|---|---|---|---|---|
| Parameters of Working Fluid Streams | | | | | |
| 1 | 0.95 | 80.0 | 145.2535 | 36.7479 | 1.4169 |
| 2 | 0.95 | 80.0 | 145.2535 | 36.7479 | 1.0 |
| 3 | 0.95 | 82.6617 | 855.0 | 40.8130 | 1.0 |
| 4 | 0.95 | 145.0 | 845.0 | 113.7445 | 1.0 |
| 5 | 0.95 | 211.1676 | 835.0 | 200.6857 | 1.0 |
| 6 | 0.95 | 296.0 | 820.0 | 653.1787 | 1.0 |
| 7 | 0.95 | 152.8503 | 150.0 | 561.9714 | 1.0 |
| 8 | 0.95 | 152.8503 | 150.0 | 561.9714 | 0.175 |
| 9 | 0.95 | 152.8503 | 150.0 | 561.9714 | 0.825 |
| 10 | 0.8847 | 147.3266 | 150.0 | 476.1683 | 0.2154 |

TABLE 1-continued

Parameter of Points in the Embodiment of FIG. 1A

| Point No. | Concentration X | Temperature T (°F.) | Pressure P (psia) | Enthalpy h (btu/lb) | Weight (g/g6) |
|---|---|---|---|---|---|
| 11 | 0.8847 | 113.2951- | 148.0 | 392.8725 | 0.2154 |
| 12 | 0.95 | 102.6927 | 148.0 | 473.5696 | 0.825 |
| 13 | 0.9365 | 105.6343 | 148.0 | 456.8624 | 1.0404 |
| 14 | 0.9989 | 105.6343 | 148.0 | 572.4092 | 0.83274 |
| 15 | 0.68629 | 105.6343 | 148.0 | −6.4813 | 0.20766 |
| 16 | 0.60227 | 211.1676 | 465.0 | 104.7724 | 0.04043 |
| 17 | 0.68629 | 105.5611 | 132.2 | −6.4813 | 0.20766 |
| 18 | 0.95 | 211.1676 | 465.0 | 559.5074 | 0.4169 |
| 19 | 0.95 | 118.4247 | 475.0 | 81.7763 | 0.4169 |
| 20 | 0.60227 | 139.2362 | 150.0 | 104.7727 | 0.04043 |
| 21 | 0.98735 | 211.1676 | 465.0 | 608.3474 | 0.37647 |
| 22 | 0.98735 | 96.1707 | 132.2 | 545.6323 | 0.37647 |
| 23 | 0.88030 | 98.6711 | 132.2 | 349.3722 | 0.5841 |
| 24 | 0.88030 | 78.0 | 130.1772 | 11.9150 | 0.5841 |
| 25 | 0.88030 | 78.1332 | 148.0 | 12.0976 | 0.5841 |
| 26 | 0.95 | 85.9850 | 148.0 | 341.4032 | 1.4169 |
| 27 | 0.95 | 80.0 | 145.2535 | 36.7479 | 0.4169 |
| 28 | 0.95 | 81.3188 | 485.0 | 38.7398 | 0.4169 |
| 29 | 0.95 | 161.1303 | 470.0 | 133.9673 | 0.4169 |
| Parameters of Geothermal Source Stream | | | | | |
| 30 | brine | 305.0 | | 273.0 | 5.0938 |
| 31 | brine | 216.168 | | 184.168 | 5.0938 |
| 32 | brine | 216.168 | | 184.168 | 1.5479 |
| 33 | brine | 160.0 | | 128.0 | 1.5479 |
| 34 | brine | 216.168 | | 184.168 | 3.5459 |
| 35 | brine | 160.0 | | 128.0 | 3.5459 |
| 36 | brine | 160.0 | | 121.0 | 5.0938 |
| 37 | brine | 166.1303 | | 134.1303 | 3.5459 |
| Parameters of Air Cooling Stream | | | | | |
| 40 | air | 60.0 | | 6.7330 | 40.9713 |
| 41 | air | 80.0 | | 11.5439 | 40.9713 |
| 42 | air | 60.0 | | 6.7330 | 119.6414 |
| 43 | air | 75.0 | | 10.3410 | 119.6414 |

The term concentration is defined as the ratio of the number of pounds of the low boiling component are each pound of working fluid. Thus, for an ammonia-water working fluid, a concentration of 0.95 means that working fluid comprises 0.95 lbs of ammonia and 0.5 lbs of water. The term weight represents that number of pounds of material passing through a given point relative to the number of pounds of material passing through the point 6 or the first part of the high temperature circuit defined by points 2–7.

The system of this invention comprises two circuits; one circuit is a high pressure circuit and the other circuit is a lower pressure circuit. The use of two circuits having different pressures makes it possible to utilize heat from the geothermal brine stream for heating the stream of the working fluid in the high pressure circuit, and heat from a portion of a cooled or lower temperature geothermal brine stream for heating the stream of the working fluid in the lower pressure circuit. Unlike known two-pressure circuit systems, in the systems of this invention, the liquid produced after the partial condensation of the spent returning stream from the high pressure circuit (i.e., the stream having the parameters of the point 15) is added to the returning stream from the low pressure circuit. Thus the concentration of the returning stream from the low pressure circuit is substantially lowered which in its turn allows this returning stream to be condensed at a pressure lower than the pressure at which it would be condensed if its composition had not been lowered. This results in an increased power output And efficiency of the whole system. The summary of the performance of the entire system is presented in Table 2.

TABLE 2

Performance Summary

| Heat Input | btu | 738.6010 |
|---|---|---|
| Heat Rejection | btu | 628.7749 |
| Σ Turbine enthalpy drops | btu | 114.8177 |
| Turbines work | btu | 111.9511 |
| Feed pumps work | btu | 5.0022 |
| Air fans work | btu | 9.10667 |
| Network | btu | 97.8422 |
| Net thermal efficiency | % | 13.25 |
| Second Law efficiency | % | 57.24 |
| Specific brine consumption | lb/btu | 0.0521 |
| Specific Power output | btu/lb | 19.2081 |

The most efficient system previously developed for the same application is described in U.S. Pat. No. 4,982,568. A comparison of the performance of that system and the system of this invention is presented in table 3. As shown in table 3, the system of this invention out performs the prior art by about 18.83%.

TABLE 3

Comparison of System Performance

| System Characteristics | Current System | System of U.S. Pat. No. 4982568 | Ratio |
|---|---|---|---|
| Net Thermal Efficiency (%) | 13.25 | 11.15 | 1.1883 |
| Specific Power Output (btu/lb. of brine) | 19.2081 | 16.1716 | 1.1878 |
| Heat Rejection per btu of Net Output (btu/btu) | 6.4264 | 7.8257 | 0.8212 |

Figure 1B:
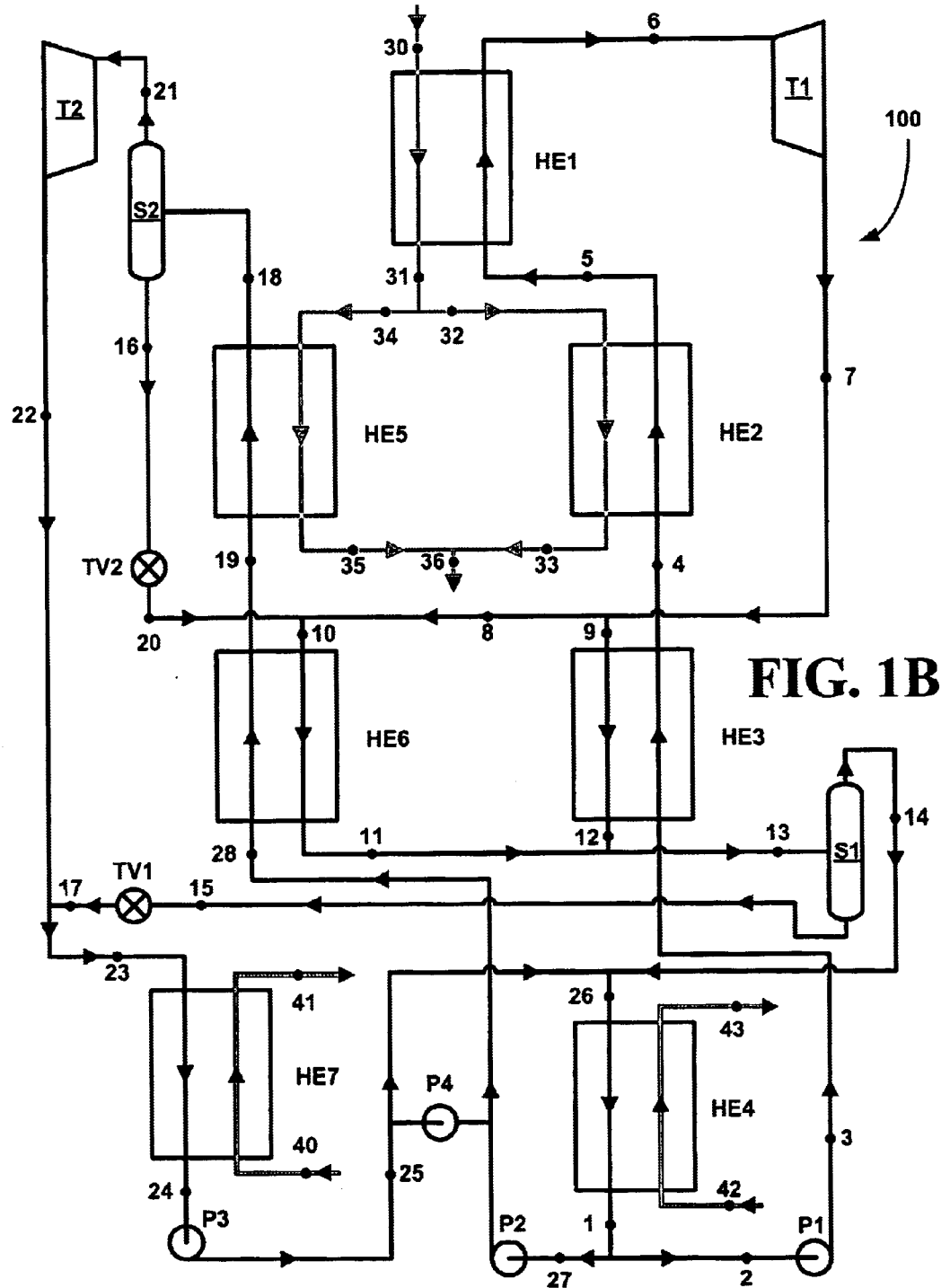
FIG. 1B depicts another preferred embodiment of an apparatus for implementing the novel thermodynamic method and system of this invention.

Referring now to FIG. 1B, a modified system of this invention is shown to include a fourth pump P4 which is used to increase the pressure of a portion of the stream having the parameters of the point 25 which is combined with the lower pressure liquid stream having the parameter of the point 28.

It should be recognized by persons of ordinary skill in the art that the apparatus of this inventions also includes stream mixer valves and stream splitter valves which are designed to combine stream and split streams, respectively. In the system of FIG. 1A, the separator S2 may not be need if the composition of the working fluid is adjusted so that the heated lower pressure stream is fully vaporized in the heat exchanger HE5, which requires a fluid having a concentration of about 0.965 or higher.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method for implementing a thermodynamic cycle comprising the steps of:

transforming thermal energy from a fully vaporized higher pressure stream into a usable energy form to product produce a spent higher pressure stream;

transforming thermal energy from a vaporized lower pressure stream into a usable energy form to produce a spent lower pressure stream;

heating a higher pressure liquid stream with a portion of a spent higher pressure stream to form a heated higher pressure stream and a first partially condensed spent higher pressure stream;

heating a lower pressure stream with a remaining portion of the spent higher pressure stream to form a heated lower pressure stream and a second partially condensed spent higher pressure stream;

heating the heated higher pressure liquid stream with a portion of an external heat source stream to form a hotter higher pressure stream and a first spent external heat source stream;

heating the heated lower pressure stream with a remaining portion of the external hear source stream to form a vaporized lower pressure stream and a second spent external heat source stream;

heating the hotter higher pressure stream with the external heat source stream to form the fully vaporized higher pressure stream;

separating the partially condensed spent higher pressure streams into a spent higher pressure liquid stream and a spent higher pressure vapor stream;

mixing the spent higher pressure liquid stream with the spent lower pressure stream at the pressure of the spent lower pressure stream to form a combined spent lower pressure stream;

condensing the combined spent lower pressure stream with an external cooling stream to form a condensed spent lower pressure stream;

mixing the condensed spent lower pressure stream with the spent higher pressure vapor stream to form a combined partially condensed spent higher pressure stream at the pressure of the spent higher pressure vapor stream;

condensing the combined partially condensed spent high pressure stream to form a fully condensed liquid stream; and forming the higher pressure stream and the lower pressure stream from a fully condensed liquid stream.

2. The method of claim 1, wherein the vaporized lower pressure stream is fully vaporized and the composition of the fully condense liquid stream is sufficient to fully vaporize the heated lower pressure stream.

3. The method of claim 1, further comprising the step of:

separating the vaporized lower pressure stream into a fully vaporized lower pressure stream and a liquid lower pressure stream;

mixing the liquid lower pressure stream with the remaining portion of the spent higher pressure stream prior to the lower pressure stream heating step; and wherein the lower pressure transforming step uses the fully vaporized lower pressure stream.

4. The method of claim 1, wherein the spent higher pressure liquid stream has a leaner composition than the composition of the fully condensed liquid stream.

5. A method for implementing a thermodynamic cycle comprising the steps of:

forming a higher pressure working fluid stream and a lower pressure working fluid stream from a fully condensed working fluid stream;

heating the higher pressure working fluid stream with a portion of a spent higher pressure working fluid stream to form a heated higher pressure working fluid stream and a first partially condensed spent higher pressure working fluid stream;

heating the heated higher pressure working fluid stream with a portion of a partially cooled external source stream to form a hotter higher pressure working fluid stream and a first spent external source stream;

vaporizing the hotter higher pressure working fluid stream with an external source stream to form a fully vaporized higher pressure working fluid stream and the partially cooled external source stream;

transforming thermal energy from the fully vaporized higher pressure working fluid stream into a usable energy form to produce a spent higher pressure working fluid stream;

heating the lower pressure working fluid stream with a remaining portion of the spent higher pressure working fluid stream to form a heated lower pressure working fluid stream and a second partially condensed spent higher pressure working fluid stream;

heating the heated lower pressure working fluid stream with a remaining portion of the partially cooled external source stream to form a vaporized lower pressure working fluid stream and a second spent external source stream;

transforming thermal energy from the vaporized lower pressure working fluid stream into a usable energy form to produce a spent lower pressure working fluid stream;

separating the first and second partially condensed, spent higher pressure working fluid a streams into a spent higher pressure liquid working fluid stream and a higher pressure vapor working fluid stream;

mixing the spent lower pressure working fluid stream with the spent higher pressure liquid working fluid stream at the lower pressure to form a combined spent lower pressure working fluid stream;

cooling the combined spent lower pressure working fluid stream with an external cooling stream to form a condensed lower pressure working fluid stream;

cooling the condensed lower pressure working fluid stream and the spent higher pressure vapor working fluid stream at a pressure of the spent higher pressure vapor working fluid stream with a second external cooling stream to form the fully condensed working fluid stream.

6. The method of claim 5, further comprising the step of:

separating the vaporized lower pressure working fluid stream into a fully vaporized lower pressure working fluid stream and a liquid lower pressure working fluid stream;

mixing the liquid lower pressure working fluid stream with the remaining portion of the spent higher pressure working fluid stream prior to the lower pressure working fluid stream heating step; and wherein the lower pressure transforming step uses the fully vaporized lower pressure working fluid stream.

7. The method of claim 5, wherein the vaporized lower pressure working fluid stream is fully vaporized.

8. The method of claim 5, wherein the spent higher pressure liquid working fluid stream has a leaner composition than the composition of the fully condensed working fluid stream.

9. An apparatus for implementing a thermodynamic cycle comprising:

first means for expanding a fully vaporized higher pressure stream, transferring its energy into usable form and producing a higher pressure spent stream;

second means for expanding a fully vaporized lower pressure stream, transferring its energy into usable form and producing a lower pressure spent stream;

a first heat exchanger adapted to condense a combined lower pressure spent stream with an external coolant stream to form a condensed combined lower pressure spent stream;

a first pump adapted to increase a pressure of the condensed combined lower pressure spent stream to form an increased pressure, condensed combined lower pressure spent stream;

a first stream mixer adapted to combine the increased pressure, condensed combined lower pressure spent stream and a vapor higher pressures spent stream to form a partially condensed stream;

a second heat exchanger adapted to condense the partially condensed stream with an external coolant stream to form a fully condensed liquid stream;

a first stream splitter adapted to form first and second portions of the fully condensed liquid stream;

a second pump adapted to increase a pressure the first portion of the fully condensed liquid stream to form a higher pressure liquid stream;

a third pump adapted to increase a pressure the second portion of the fully condensed liquid stream to form a lower pressure liquid stream;

a third heat exchanger adapted to heat the higher pressure liquid stream with a first portion of a higher pressure spent stream to form a heated higher pressure liquid stream and a first partially condensed higher pressure spent stream;

a fourth heat exchanger adapted to heat the lower pressure liquid stream with a remaining portion of the higher pressure spent stream to form a heated lower pressure liquid stream and a second partially condensed higher pressure spent stream;

a fifth heat exchanger adapted to heat the heated higher pressure liquid stream with a first portion of a partially cooled external heat source stream to form a hotter higher pressure liquid stream and a first spent external heat source stream;

a sixth heat exchanger adapted to heat the heated lower pressure liquid stream with a remaining portion of the partially cooled external heat source stream to form a vaporized lower pressure stream and a second spent external heat source stream;

a seventh heat exchanger adapted to vaporize the hotter higher pressure liquid stream with an external heat source stream mixer to form the fully vaporized higher pressure stream and the partially cooled external heat source stream;

a second stream splitter adapted to form the first and second portions of the higher pressure spent stream;

a third stream splitter adapted to form the first and second portions of the cooled external heat source stream;

a second stream mixer adapted to combine the first and second partially condensed higher pressure spent stream to form a combined partially condensed higher pressure spent stream;

a gravity separator adapted to separate combined partially condensed higher pressure spent stream into a lean liquid stream and a rich vapor stream;

a throttle valve adapted to change the pressure of the lean liquid stream to a pressure of the lower pressure spent stream; and a third stream mixer adapted to combine the pressure adjusted lean liquid stream with the lower pressure spent stream, where the apparatus results in an improved efficiency.

* * * * *